April 25, 1950

R. N. MILLER ET AL 2,505,501

TRACK CLEANING CAR

Filed March 3, 1943

FIG_1_

FIG_2_

INVENTORS:
Robert N. Miller &
William H. Grindall,

BY

Paul + Paul
ATTORNEYS.

FIG. 4.

April 25, 1950 R. N. MILLER ET AL 2,505,501
TRACK CLEANING CAR
Filed March 3, 1943 12 Sheets-Sheet 9

INVENTORS:
Robert N. Miller &
William H. Grindall,
BY
ATTORNEYS.

April 25, 1950 — R. N. MILLER ET AL — 2,505,501
TRACK CLEANING CAR
Filed March 3, 1943 — 12 Sheets-Sheet 11

FIG_16_

FIG_17_

FIG_18_

INVENTORS:
Robert N. Miller &
William H. Grindall
BY
ATTORNEYS.

Patented Apr. 25, 1950

2,505,501

UNITED STATES PATENT OFFICE 2,505,501

TRACK CLEANING CAR

Robert N. Miller, Rosemont, and William H. Grindall, Narberth, Pa., assignors to The Pennsylvania Railroad Company, Philadelphia, Pa., a corporation of Pennsylvania Application March 3, 1943, Serial No. 477,886

16 Claims. (Cl. 15—55)

This invention relates to railway track cleaning cars. In the operation of railways in coal mining districts or in desert regions, difficulties are had with electrically-actuated signal systems due to short circuiting of the rails by heavy accumulation and packing of cinders, sand and/or dirt, etc., on the track beds. To keep the road beds clean, it has been necessary heretofore to employ road gangs to manually remove the refuse deposits from time to time which was not only a slow and arduous task, but extremely costly to the railroads.

The chief aim of our invention is to overcome the above mentioned drawbacks, that is to say, to make it possible to quickly and efficiently break up and dislodge such accumulated refuse from the track beds, not only from the portions between the rails and beyond them, but from beneath the bridging portions of the rails between the ties as well; and to collect the material so dislodged.

This desideratum is realized in practice as hereinafter more fully disclosed, in a track cleaning car designed for travel on the track rails at a moderate rate, and having incorporated therewith; blast means for continuously dislodging clinging matter from within the side hollows of the rails in addition to that packed beneath the rails between the ties; gathering means for continuously collecting the disintegrated refuse; means for continuously elevating the collected material to a high level on the car for gravity discharge into an attending dirt car; and means for continuously wiping the rails clean of any grit or dirt which may have fallen upon them.

In connection with a track cleaning car characterized as above, it is a further aim of our invention to enable provision of means whereby the blast means and the gathering means can be individually withdrawn from normal proximity to the track bed and secured in retracted positions preparatory to high speed travel of the car between different localities where cleaning is to be effected.

Another object of our invention is to provide for the support of the blast and the collecting mechanisms in such a way that they may yield to free up and down movement in overpassing irregularities in the refuse deposits and be thereby protected against possible injury during the cleaning.

Other objects and attendant advantages will appear from the following detailed description of the attached drawings, wherein.

Figure 8:
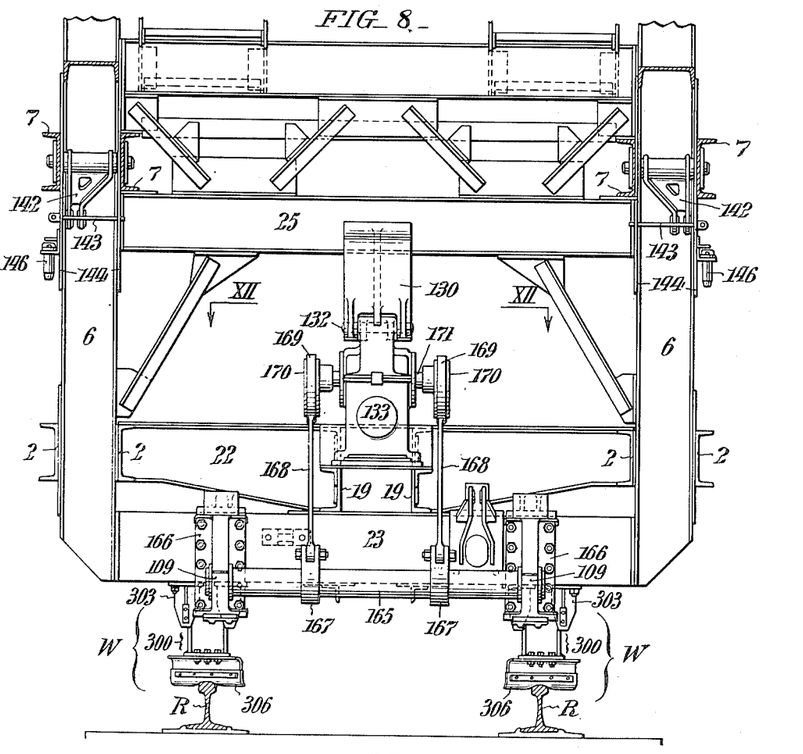

As best shown in Figs. 2–7 my improved track cleaning car has an open body framework built up of structural steel, with relatively short laterally-spaced pairs of inner and outer side sill channels 1 and 2 respectively at the front and rear portions of the car above the wheeled supporting trucks 3 and 4, channel side uprights 5 and 6 which extend upward from between said side sill pairs at the inner ends of the latter, and laterally spaced pairs of main side longitudinals 7 which are rigidly secured to opposite sides of said side uprights at an elevation above said side sills. The body framework also has laterally spaced pairs of supplemental side longitudinals 8 likewise rigidly secured to opposite sides of the uprights 5 and 6 at an elevation above the main side longitudinals 7, and a series of suitably spaced intermediate side uprights 9, 10, 11 and 12 by which said main and supplemental side longitudinals are connected, as well as forwardly and rearwardly declining parallel diagonal side struts 13, 14 and 15, 16 respectively by which said longitudinals are rigidly tied to the side sills 1 and 2 at the end portions of the framework. From Fig. 5 it will be observed that the inner side sills 1 are transversely connected at opposite ends to the parallel center sill channels 19 of the body by cross members 17 and 18, and that the uprights 9 extend below said sills and have their lower ends connected by a cross member 20. Similarly from Fig. 8 it will be noted that the rear side sills 2 are transversely connected at opposite ends to the center sill channels 19 by cross members 21 and 22, and that the lower ends of the uprights 6 extend below said sills for connection by a cross member 23. The body framework further includes a cross member 24 (Fig. 5) which extends between the uprights 9 immediately below the main side longitudinals 7; a cross member 25 which extends between the uprights 6 immediately beneath said main side longitudinals 7; and other supplemental longitudinals and cross members which will be separately referred to later on as occasion may require. From this construction there results a relatively light but nevertheless strong and rigid framework whereof the medial portion is bridged between the trucks 3 and 4 with provision of a relatively high interval between said trucks for accommodation of scarifying, blast, gathering, conveying and rail wiping means which are comprehensively designated in the drawings by the letters S, B, C, G, and W respectively. The car is further provided with a hoisting means generally designated H.

Figure 6:
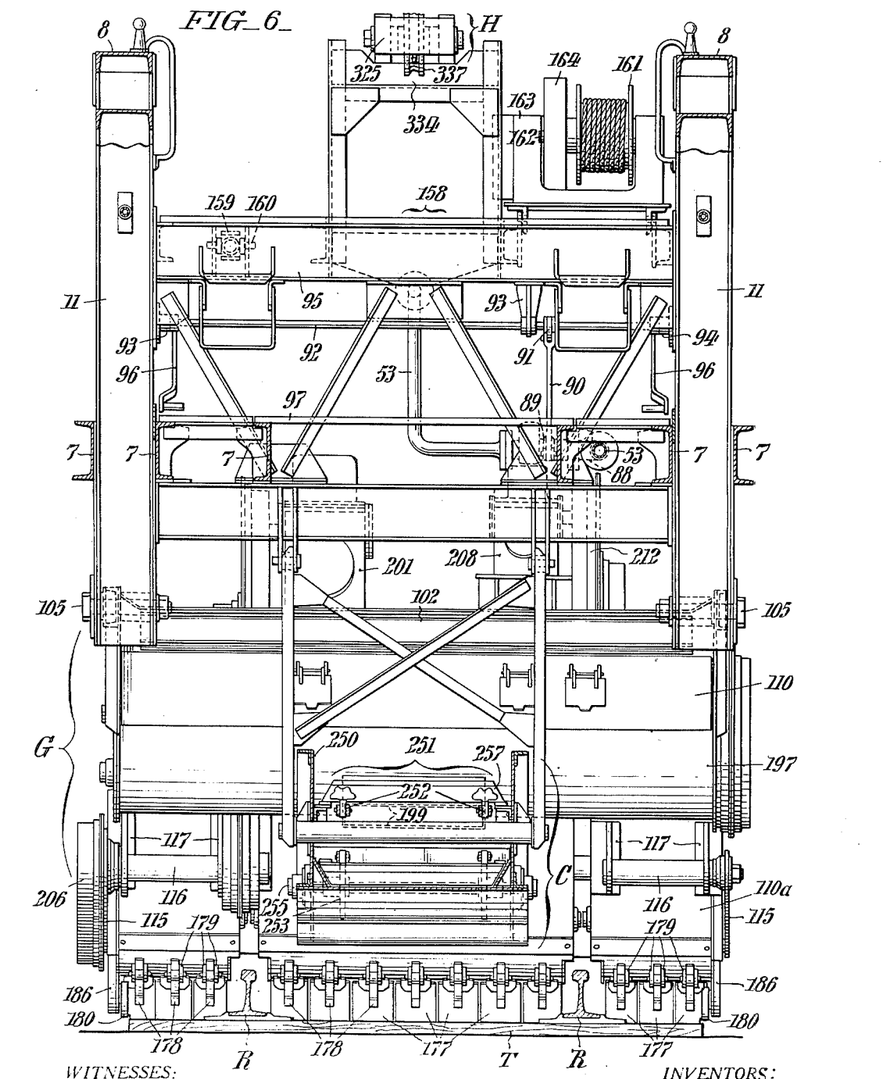
Figs. 6, 7 and 8 are cross sectional views of the car taken as indicated respectively by the arrows VI—VI, VII—VII and VIII—VIII in Figs. 2 and 4.
Figure 7:
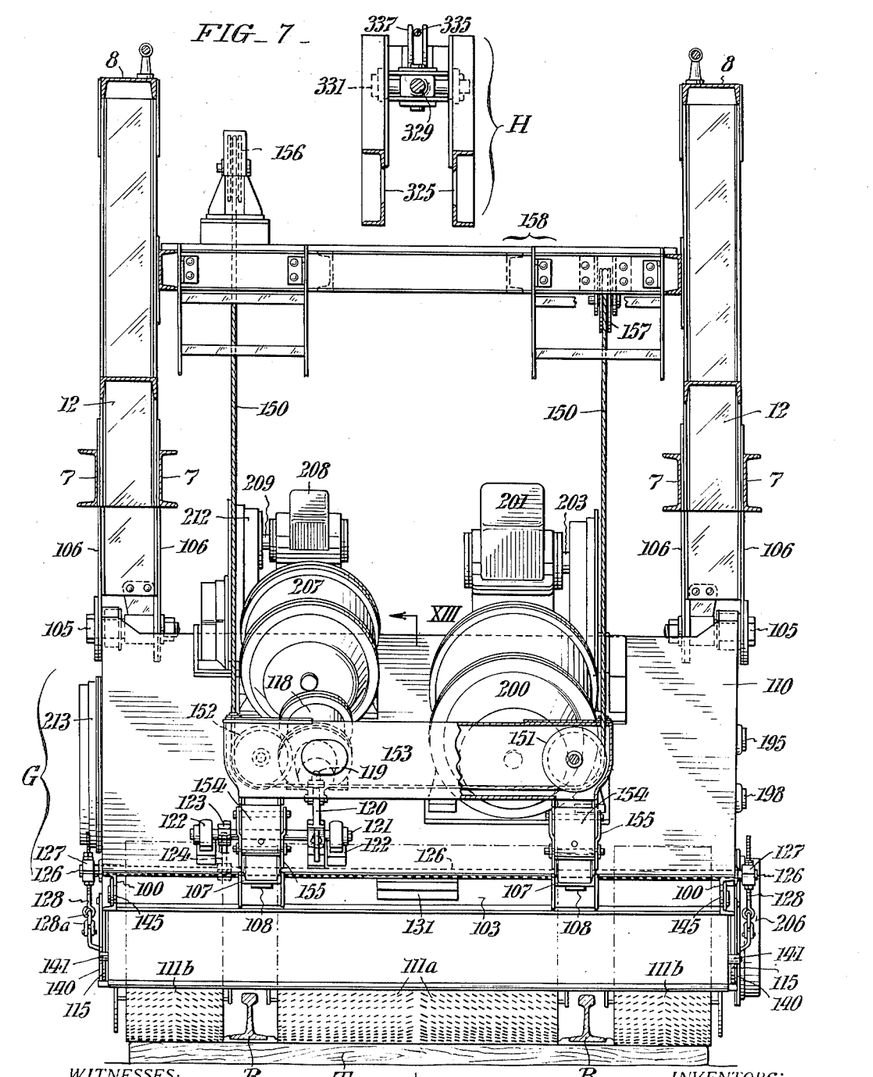

The blast means B, per se, forms the subject matter of a separate divisional application Ser. No. 709,636, filed by William H. Grindall, one of the present applicants, on November 13, 1946. In accordance with the present invention the blast means B is disposed beneath the receiving end of the elevating conveyer means C and attached to the rear of the front truck 1 of the car. Briefly described, this blast means B comprises housings 65 (Fig. 3) one adapted to extend over each track rail R, and each provided with a runner 59 with its opposite ends curved upwardly for capacity to ride over abnormal obstructions on the track bed. The housings 65 are rigidly united by two parallel cross members 40 and 41, and the unit B is pivoted at 72 to a frame 70 which is in turn pivoted at 71 to the front truck 1. As a consequence, the unit B can be lifted bodily clear of the track rails R from the position of Fig. 3 to the position of Fig. 2 when its use is not desired, it being lockable in raised operative position by pins 73 which are adapted to be passed through eyes in the free end of the frame 70 upon registry with eyes in receiving clips 75 pendent from opposite sides of the car body. The unit B is arranged to be lifted by a cable 77 which passes about a guide sheave 81 on the car frame, and which is wound upon a take-up drum 82. As shown, this drum 82 is affixed to the shaft 83 of a speed reducer 85 mounted, with an electric drive motor 86 therefor, on the platform of the front truck 1. Steam or other pressure fluid used in the blasting is conducted to the unit B by way of piping 50 and 53, said piping having interposed therein a universal joint 52 to permit lifting of the unit as above described. Also interposed in the piping 53 is a control valve 88 see Figs. 4 and 6 whereof the actuating lever 89 is coupled by means of the link 90 with an arm 91 on a crosswise rock shaft 92. As shown in Fig. 6 the rock shaft 92 is journalled in bearing brackets 93 and 94 respectively attached to a supplemental cross member 95 and to the supplemental uprights 11 of the car framework between which said cross member extends. Fixed to the rock shaft 92 adjacent its opposite ends are hand levers 96 convenient of access for manipulation by an attendant standing on an operator's control platform 97 at the level of the side longitudinal 7 approximately midway of the length of the car.

Gathering means

Figures 9, 10, 11:
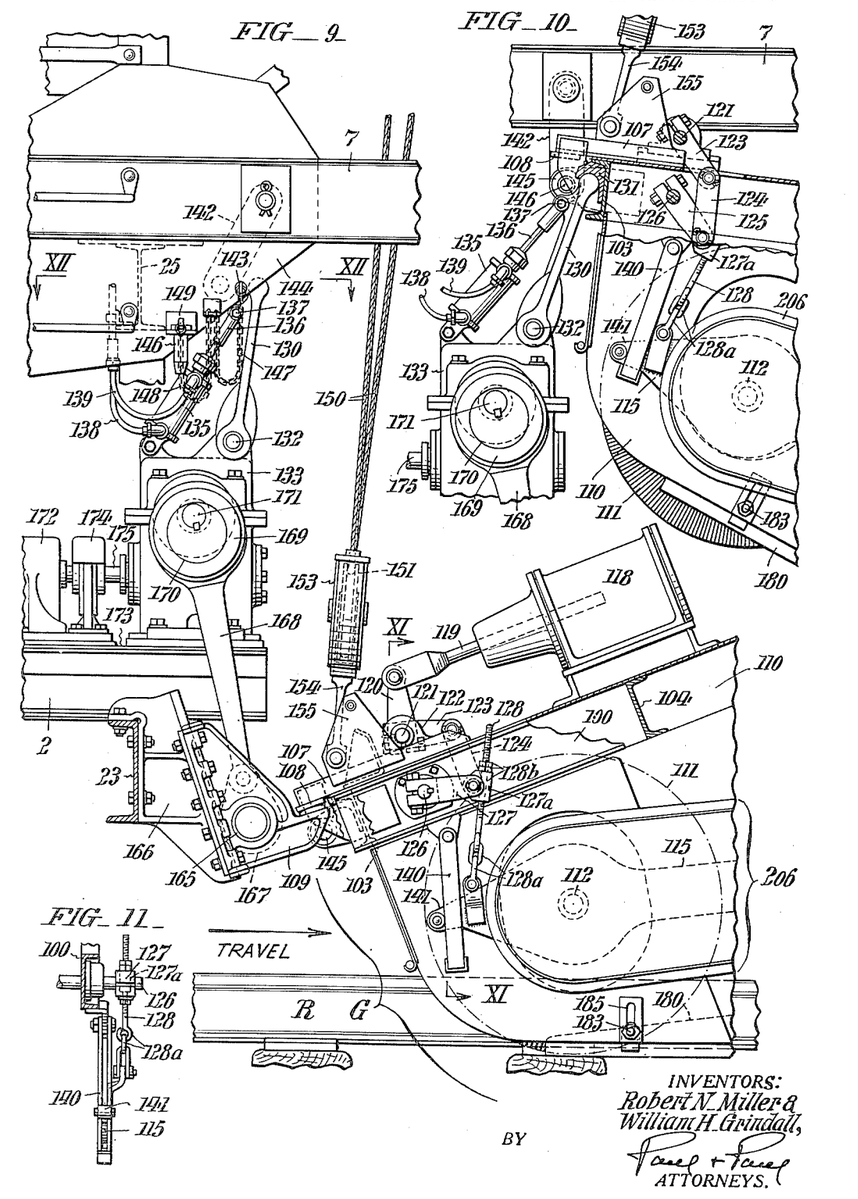
Fig. 9 is a fragmentary detail view in side elevation of the mid portion of the car showing means for adjusting the height of rotary brushes of the gathering means to compensate for wear, and means whereby the gathering means can be elevated to and locked in retracted position with the brushes supported clear of the track rails.
Fig. 10 is a fragmentary broken out view corresponding to Fig. 9 showing the gathering means locked in elevated position.
Fig. 11 is a fragmentary detail sectional view taken as indicated by the angled arrows XI—XI in Fig. 9.
Figure 12:
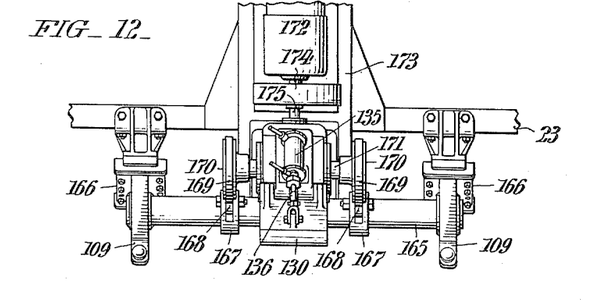
Fig. 12 is a fragmentary detail view looking as indicated by the angled arrows XII—XII in Figs. 4 and 9.
Figures 13, 19, 20:
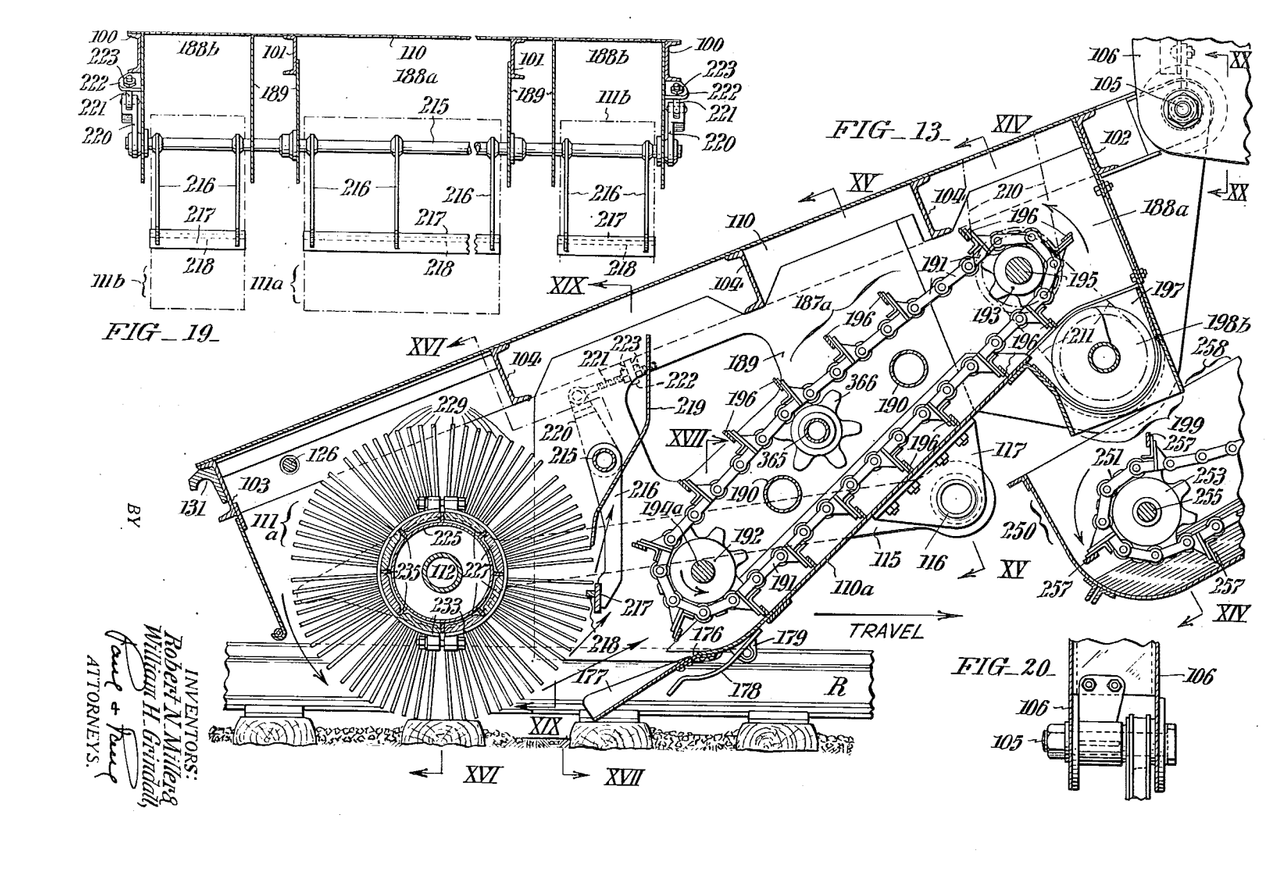
Fig. 13 is a central longitudinal sectional view of the gathering means, taken as indicated by the angled arrows XIII—XIII in Fig. 7.
Figs. 19 and 20 are detail cross sectional views taken as respectively indicated by the angled arrows XIX—XIX and XX—XX in Fig. 13.
Figure 15:
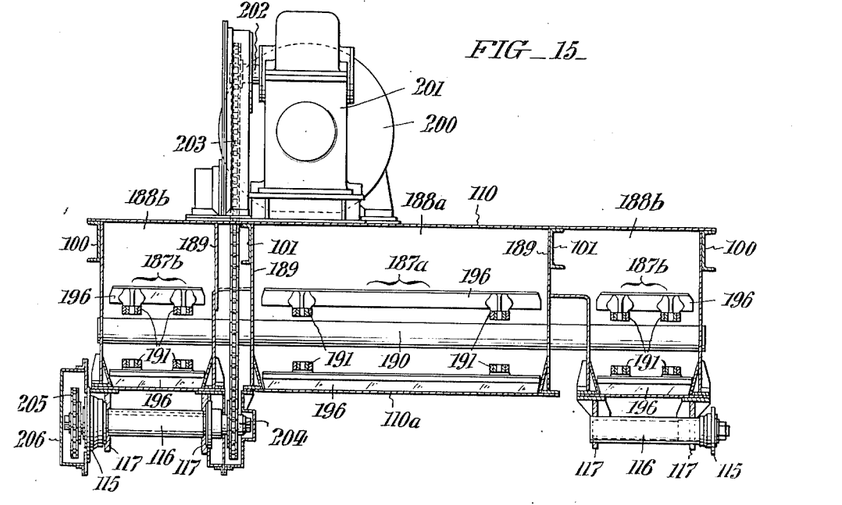
Figure 16:
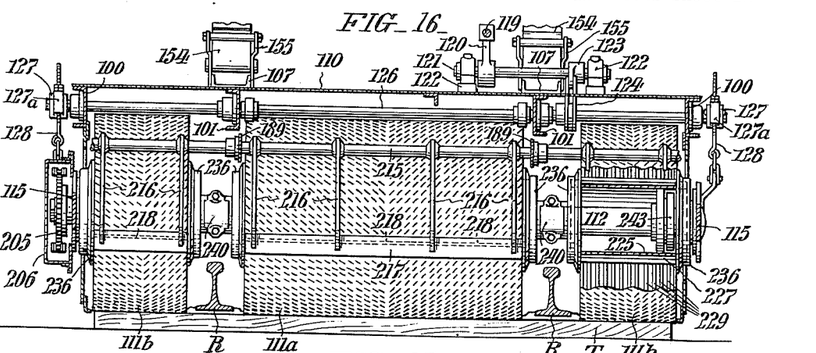

For description of the gathering means G, reference will be had to Figs. 4, 6–8 and 9–23. As shown, the means G has a frame of structural steel with side channels 100 and intermediate longitudinals 101 connected by crosswise end members 102 and 103, and intermediate cross channels 104, see Figs. 4, 7 and 13. The forward ends of the side channels 100 are pivoted at 105 to pendent ear plates 106 on the car framework. Secured to the side channels 100 at their rear ends are bars 107 (Figs. 9 and 10) which carry pads 108 of rubber or the like adapted to bear on the projecting ends of stops 109 whereby the means G is normally supported at the proper elevation relative to the track bed. Disposed within a sheet housing 110 suspended from the frame of the mechanism G is a rotary brush 111, which, per se, is covered in U. S. Patent #2,398,241 granted to us on April 9, 1946, and which, see Fig. 16, is composed of three sections whereof the intermediate one 111a is the longest and adapted to sweep the track bed between the rails R, while the outer ones 111b are narrower and are adapted to sweep the margins of the track bed beyond said rails. As shown, the brush sections 111a and 111b are mounted on a common shaft 112 which is journaled for rotation in bearings 113 and 114 at the rear ends of a pair of carrier arms 115. From Figs. 4, 6 and 15 it will be noted that the brush-carrying arms 115 are fulcrumed on aligned transverse tubular axes 116 supported by pendent brackets 117 on the frame of the mechanism. As a consequence the brush 111 is free to rise and fall in passing over irregularities of the track bed. When the brush 111 is in use, it is pneumatically balanced against bouncing by an air cylinder 118 mounted on the top of the frame of the gathering means, the piston rod 119 of said cylinder being connected to a fixed lever 120 on a transverse shaft 121 journaled at its ends in bearings 122 on said frame. Another lever 123 on the shaft 121 is coupled by a link 124 with a lever 125 (Fig. 10) on a transverse shaft 126 journaled in the frame. Affixed to the ends of the shaft 126 are levers 127, which are adjustably coupled with the outer ends of the brush-carrying arms 115, the interposed connection at each side of the gathering means G including an eye bolt 128 whereof the threaded shank passes up through a swivelled sleeve 127a on the arm 127, a pair of links 128a and a pair of stop nuts 128b which engage the protruding end of said bolt and bear on the top of said sleeve. Through the means just described, adjustments can be made for broom wear and for car and track irregularities. Air for operating the pneumatic cylinder 118 is stored in two tanks 129 suitably supported in suspension by the framework of the car, see Fig. 3, and conducted to the cylinder through piping (not shown) with suitable interposed valves by which the flow of the compressed air can be controlled to maintain the desired balance on the brush 111. In preparation for travel of the car at high speeds from place to place, the gathering mechanism G is raised to the elevated position shown in Fig. 4, in which position it is held after the manner shown in Fig. 10, by means of a stop member 130 whereof the top edge is rounded to engage within a socketed lug 131 on the rear end cross-member of the frame. As shown, the stop member 130 is fulcrumed at 132 on the casing of a gear reducing unit 133 which will be again referred to later, and operable by means of a pneumatic cylinder 135 pivotally connected at its lower end to said gear casing, and having its piston rod 136 pivotally connected at 137 to said stop member near the top thereof, compressed air being supplied and exhausted from the cylinder through tubes shown at 138 and 139 under control of manual valves (not illustrated). Normally, the stop member 130 occupies the retracted position shown in Fig. 9, and, after the mechanism G has been raised, said member is moved outwardly by admission of compressed air into the cylinder 135, to the position shown in Fig. 10 whereafter the mechanism is lowered slightly, and the lug 131 thereby allowed to come to rest on said member. The stirrups indicated at 140 in Figs. 9-11 serve by cooperation with projections 141 at the swinging ends of the brush carrying arms 115, to prevent the brush 111 from falling out of the housing 110, as shown in Fig. 10, when the means G is raised to idle position, but will allow free up and down or floating movement of said brush when said means is in the normal or active position in which it is shown in Figs. 9 and 13. As a safeguard against accidental dropping of the means G from its raised or idle position if for some reason or other the stop member 130 should become dislodged, we have provided at each side of the car framework a clevised link 142, see Fig. 8, which is pivotally hung from the side channel bars 7 at one side of the car, and which is normally held retracted out of the way by a pin 143 passed through a reinforcing web 144 on said framework. At their lower ends, the links 142 have apertures for registry with apertures in lugs 145 on the side channels 101 of the frame of the means D for insertion of locking pins 146 as shown in Fig. 10. To preclude their loss, the pins 143 and 146 are respectively attached by chains 147 and 148, see Fig. 9, to the car framework, the pin 143 being inserted into a keeper aperture in the web 144 and the pin 146 into an apertured lug 149 on said framework so as to be kept from dangling. The mechanism provided for raising and lowering the means G includes a cable 150 which underpasses a pair of sheaves 151 and 152, see Figs. 7 and 9, journaled within the ends of a hollow cross-member 153, which, by drop links 154, is connected to upstanding lugs 155 at the swinging end of the frame of said means. The ends of the cable 150 pass rearwardly over sheaves 156 and 157 respectively supported by a platform 158 on the framework of the car at an elevation above the side longitudinals 7, see Fig. 7, and then forwardly beyond said sheaves, one end being connected to a spring element 159 which is in turn connected to a fixed anchorage 160 on said framework. The other end of the cable 150 likewise passes forwardly and is connected to a winding drum 161 on the output shaft 162 of a speed reducer 164 driven by an electric motor 163, said reducer and motor being also supported on the platform 158. It is to be understood that during the operation of the car, the cable 150 is left relatively slack and therefore does not carry any of the weight of the means D, which, as already explained, is supported at that time by the stops 109. As shown in Figs. 4, 8, 9 and 12, the stops 109 are in the form of slides which are connected by a crosswise tubular member 165 and which are adjustable in guide brackets 166 secured to the supplemental cross member 23 of the car framework beneath the side sills 2. Affixed to the tube 165 in laterally spaced relation between the brackets 166 are collars 167 which have pivotal connection with the rods 168 of eccentric straps 169 engaging eccentrics 170 at opposite ends of the delivery shaft 171 of the speed reducing unit 133 previously referred to. This speed reducing unit 133 is operable by an electric motor 172 which is mounted alongside said unit on a platform 173 supported on the side sill members 2. Thus, when the motor 172 is driven in one direction or the other, the stops 109 are simultaneously raised or lowered by the action of the eccentrics 170 on the shaft 171. The brake means generally indicated by the numeral 174 in Fig. 9 is directly influential upon the shaft 175 of the motor 172 to normally hold it against rotation.

Figure 18:
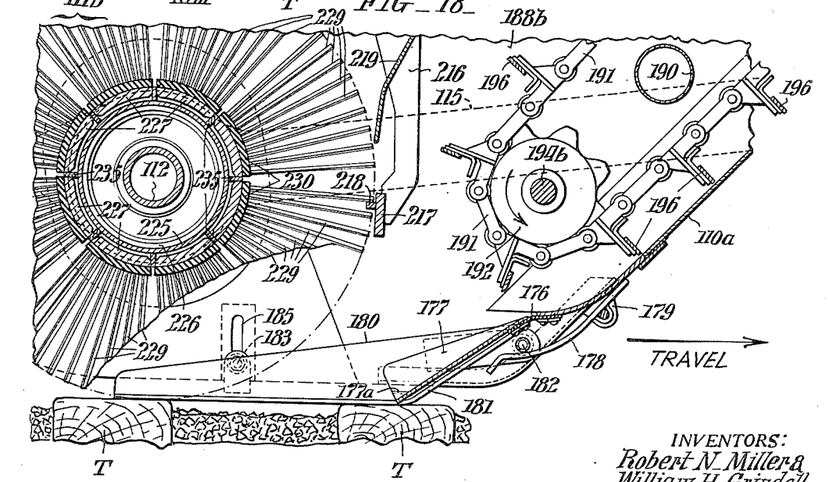
Fig. 18 is a fragmentary detail view of the gathering means in longitudinal section, corresponding to Fig. 13, but taken as indicated by the arrows XVIII—XVIII in Fig. 17, and drawn to a larger scale to more clearly show important structural details.
Figure 21:
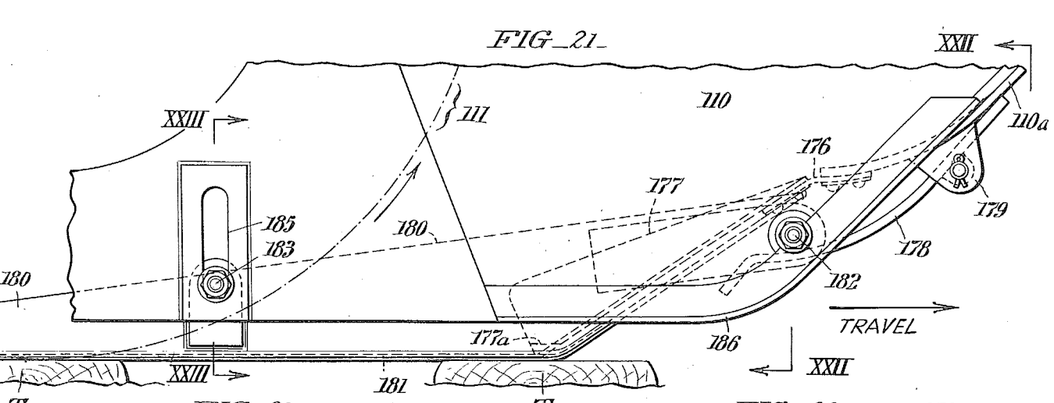
Fig. 21 is a fragmentary detail view, corresponding to Fig. 4, in side elevation, of a portion of the gathering means.
Figure 22:
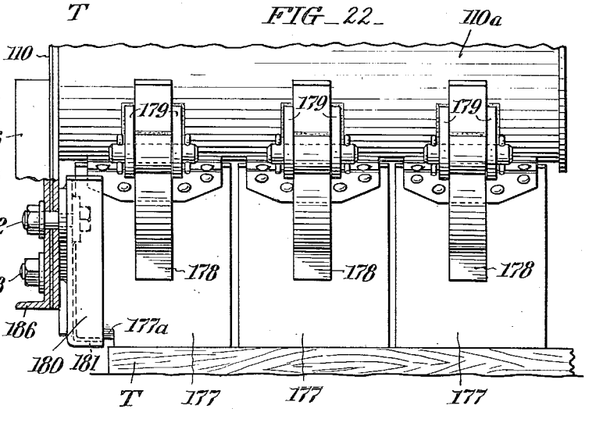
Figs. 22 and 23 are detail sectional views taken as respectively indicated by the angled arrows XXII—XXII and XXIII—XXIII in Fig. 21.
Figure 23:
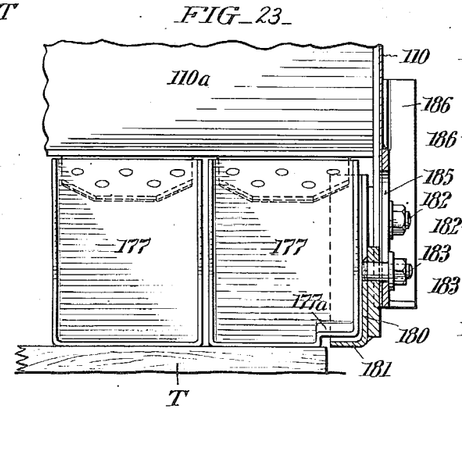

During the operation of the cleaning car, the brush 111 rotates in the direction indicated by the arrow in Fig. 13 and gathers up the material loosened by the scarifying and blasting mechanisms S and B, sweeping it forwardly into the housing 110 whereof the bottom slopes upwardly as shown at 110a. Individually connected to the rear edge of the housing bottom 110a by flexible hinges 176 of leather or the like, are drag pans 177 which are divided into three groups to correspond with the subdivisions 111a and 111b, 111b of the brush 111, the center group to ride over the track bed between the rails R and the two outer groups to ride over the track bed beyond said rails. When the means G is raised to its inactive position, downward movement of the pans 177 is limited by individually-associated underreaching stop fingers 178, said fingers being pivoted on small brackets 179 secured to the bottom 110a of the housing 110 and limited in movement through engagement of prolongations at their upper ends with said housing bottom. At opposite sides beyond the endmost drag pans 177, the housing 110 is provided with guard elements 180 fashioned from sheet metal to right-angular cross section with their inwardlydirected horizontal bottom flanges 181 underreaching outer corner recessions 177a of the endmost drag pans 177, as best shown in Figs. 21–23. At their front ends the guard elements 180 are pivotally connected at 182 to the opposite sides of the housing 110 for the purposes of independent adjustability. As shown, the guard elements 180 are restrained against lateral movement and held in adjusted positions by bolts 183 which pass through vertical slots 185 in the side walls of the housing 110, with their bottom edges approximately at the level of the ties T. Thus, during track cleaning, the pans 177 are free to rise and fall in adapting themselves to undulations or irregularities in the surface of the track bed, such movement being facilitated by reason of the inclination of said pans; while the guards 181, which, it is to be particularly observed from Fig. 18, reach to a point below the axis of the brush 111 and thereby prevent lateral escape of the collected sweepings from the sides of the housing 110. The reinforcing angles shown at 186 strengthen the housing 110 at the bottom and act as lift skids in the event that abnormal obstructions are met with.

Figure 4:
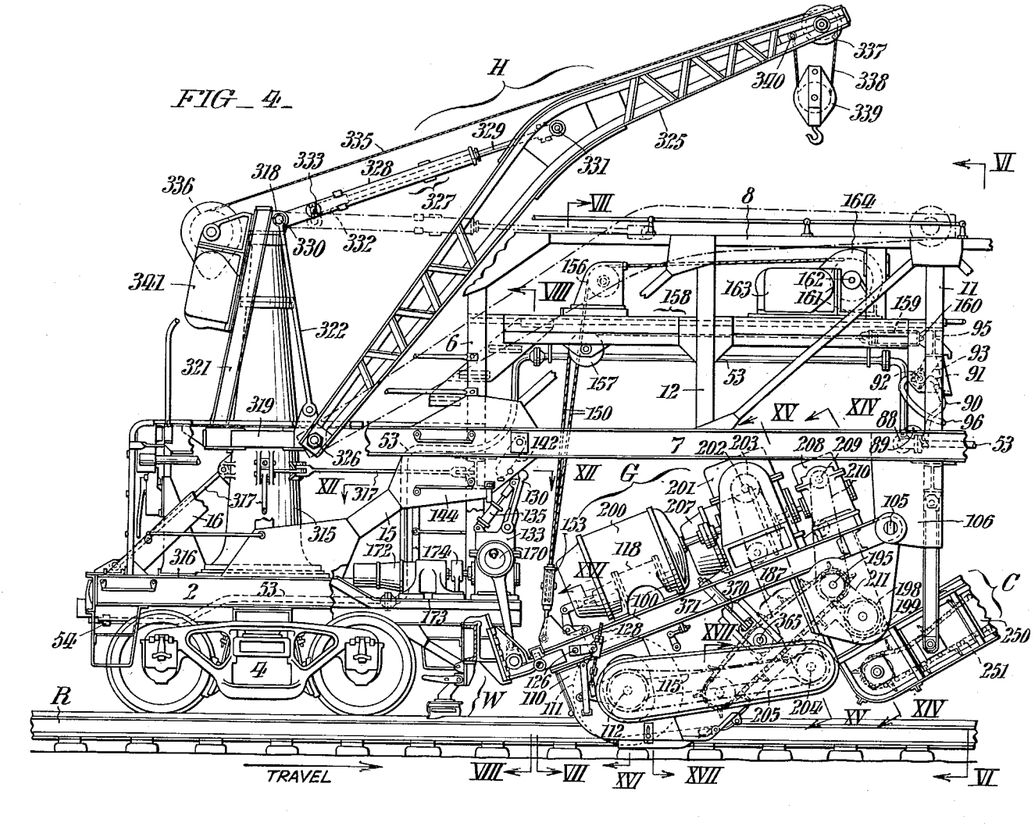
Fig. 4 is a view corresponding to Fig. 3 showing the rear half portion of the car in side elevation.
Figure 5:
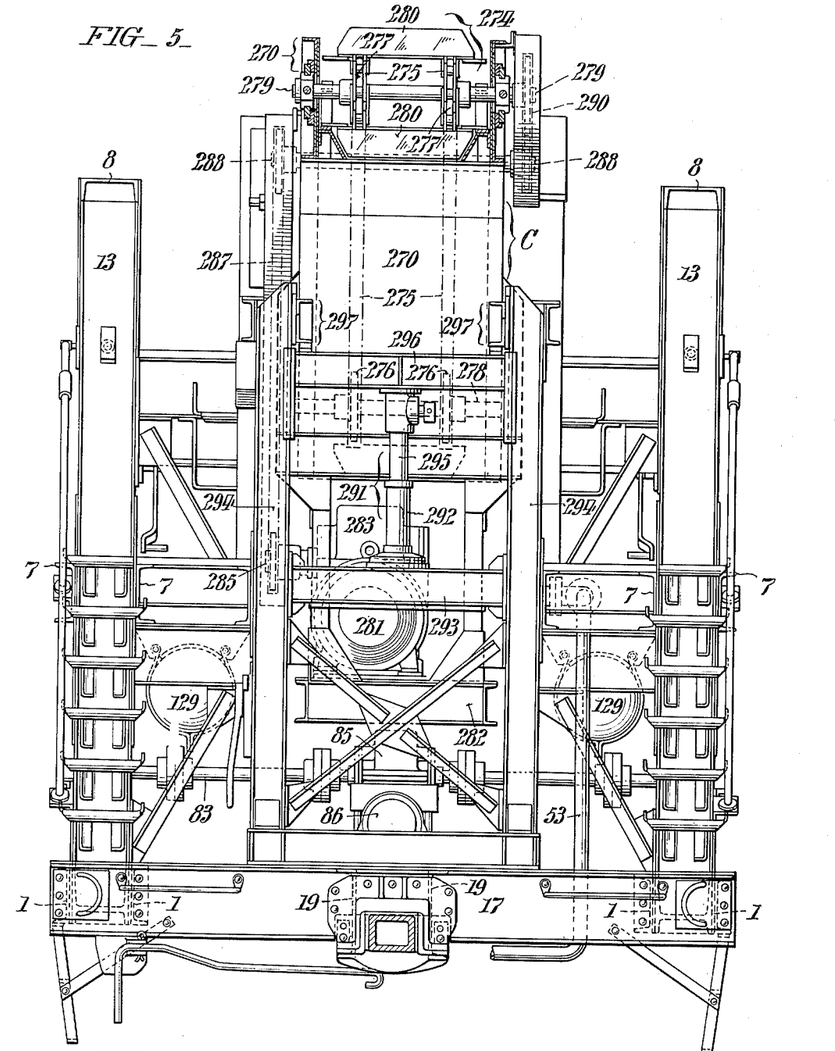
Fig. 5 shows the front end elevation of the car with certain parts thereof in cross section, the plane of which is indicated by the angled arrows V—V in Fig. 3.
Figure 14:
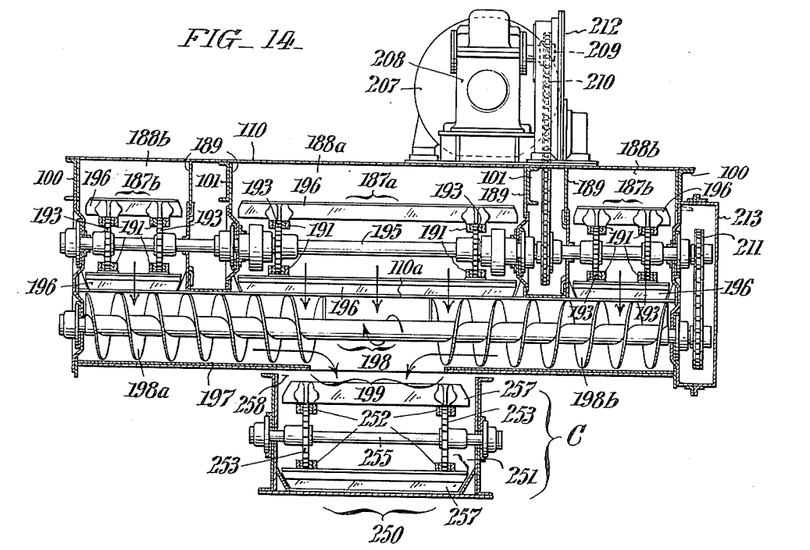
Figs. 14, 15, 16 and 17 are detail cross sections of the gathering means taken as respectively indicated by the angled arrows XIV—XIV, XV—XV, XVI—XVI, and XVII—XVII in Figs. 4 and 13.
Figure 17:
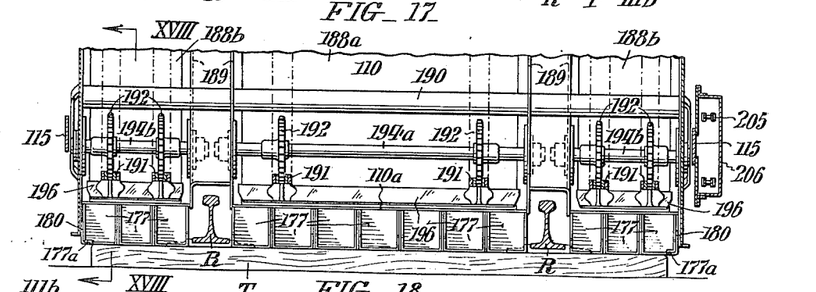

Within the housing 110 immediately forward of the rotary brush 111 is an inclined lift conveyer 187 whereof there are three sections 187a, 187b, 187b (Figs. 14, 15 and 19) which correspond to the three sections of said brush. As shown, the three sections of the conveyer 187 operate in three trunk subdivisions 188a, 188b, 188b set apart within the housing 110 by laterally spaced partitions 189, which are penetrated and sustained by a pair of transverse tubular girts 190 extending from side to side of said housing. Each section of the conveyer 187 comprises a pair of laterally spaced chains 191 which are trained about pairs of end sprocket wheels 192 and 193. The lower pairs of sprocket wheels 192 for the respective chain pairs are mounted on separate but aligned shaft sections 194a, 194b, 194b, as shown in Fig. 17, while the three upper sets of sprocket wheels 193 are all mounted on a common crosswise shaft 195, see Fig. 14. The direction of movement of the several conveyer chains is as indicated by a curved arrow in Fig. 13, and, as shown, each conveyer section has pusher vanes 196 which extend crosswise between its component chains and drag along the inclined bottom 110a of the housing 110. For the purpose of compensating for wear of the conveyer chain 191, we have provided, as shown in Figs. 4 and 13, a slack take-up means which comprises a transverse shaft 365 with idler sprockets 366 thereon in engagement with the upper run of said chain. The shaft 365 is journaled at its ends, in bearings 367 carried by plates 368 which are adjustable in guideways 369 at opposite sides of the housing 110, through pivotally attached rods 370 extending up through bosses 371 on the frame 100 and provided at their protruding threaded ends with draw nuts 372. Pivoted retractable keepers 373 serve to prevent accidental rotation of the nuts 372 after adjustment of the latter. At their upper ends the trunks 188a, 188b, 188b communicate through openings at their bottoms with a transverse trough 197 which is built into the housing 110, see Figs. 13 and 14 and which contains a screw conveyer 198 having oppositely pitched end portions 198a and 198b whereby the collected material is worked inwardly toward a central bottom outlet 199. The power for driving the brush 111 is derived from an electric motor 200 mounted on the top of the frame of the housing 110, the shaft of the motor being directly connected to a speed reducer 201. The output shaft 202 of this speed reducer 201 is connected by a sprocket chain 203 with a shaft 204 and the latter shaft is in turn connected by another sprocket chain 205 with the shaft 112 of the brush 111, see Fig. 4. As further shown in Fig. 4, and also in Figs. 9 and 10, the chain 205 is enclosed in a separate housing 206 which extends along one side of the brush housing 110 and which is attached to one of the brush carrying arms 115. The chain conveyer sections 187a, 187b, 187b, on the other hand, derive their motion from another electric motor 207 which is mounted on the top of the housing 110 alongside the motor 200 and which has its shaft directly connected to a smaller speed reducing unit 208; the output shaft 209 of said unit being connected by a chain 210 with the shaft 195 of said conveyer units, and the shaft of the screw conveyer 198 being connected by a sprocket chain 211 with said shaft 195 as shown in Fig. 14. The chains 210 and 211 are respectively enclosed in housings 212 and 213 also attached to the main housing 110 as also clearly shown in Fig. 14.

Extending transversely of the housing 110 immediately forward of the brush 111 (Figs. 13, 16 and 19) is a shaft 215 with plural pendent arms 216 which are arranged in three groups, the arms of such groups supporting at their lower ends within the trunks 188a, 188b, 188b, cross bars 217 with rearwardly projecting longitudinal ridges 218 in the path of the ends of the bristles of the respective brush sections. By this means, the brush bristles in passing, are flexed to throw off debris which may cling to them, such debris being diverted forwardly in the housing 110 by deflecting baffles 219 in the respective trunks 188a, 188b, 188b into the province of the several sections of the conveyer 187, and eventually carried along by the vanes 196 of said conveyer as they drag the bottom of said housing 110. As shown in Figs. 13 and 19, the ends of the shaft 215 protrude at the sides of the housing 110 for rigid attachment to them of arms 220. Eye bolts 221 pivotally connected to the upper ends of the arms 220 have their shanks passing through apertured lugs 222 at the sides of the housing 110 and provided with nuts 223 to engage the opposite faces of said lugs. This means makes possible adjustment of the bars 217 relative to the several sections of the brush 111 to vary the extent to which the brush bristles are flexed.

*Elevating conveyer means*

Figure 3:
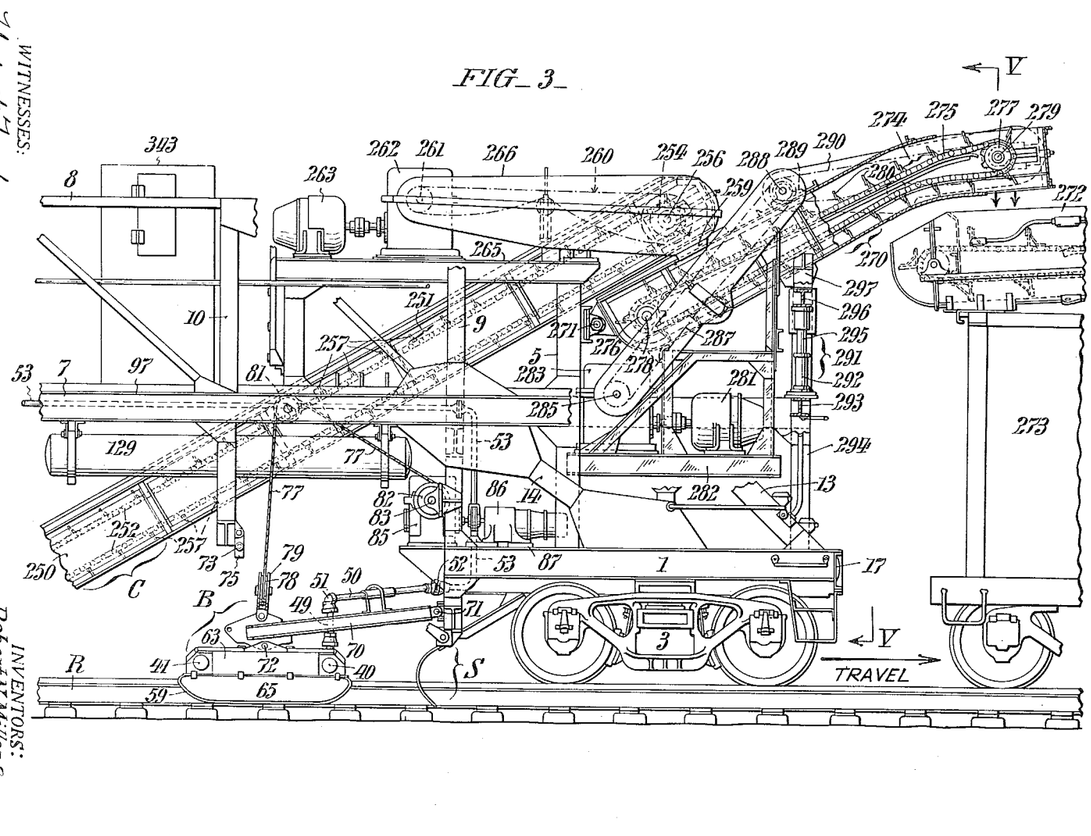
Fig. 3 is a view drawn to a still larger scale showing the front half portion of the car in side elevation.

Disposed in the central longitudinal plane of the car is the elevating conveyer means which is comprehensively designated by the letter C. As shown, this conveyer means includes a trunk 250, see Figs. 3, 4, 13 and 14, which extends upwardly and forwardly at an inclination from a point immediately beneath the discharge outlet 199 of the trough 197 of the gathering means G to a point at the top of the car body above the truck 3, said trunk being rigidly secured to the car framework. Within the trunk 250 is a conveyer 251 consisting of a pair of laterally spaced chains 252 which are trained about sprocket wheels 253 and 254 on shafts 255 and 256 journaled respectively in suitable bearings in the side walls of said trunk adjacent the upper and lower ends of the latter. The crosswise vanes 257 of the conveyer 251 drag along the bottom of the trunk 250, and carry the debris received from the housing 110 of the gathering means G through a top opening 258 at the lower end of the trunk, to a bottom outlet 259 at the upper end of said trunk. The sprocket shaft 256 of the conveyer 251 is driven by means of a sprocket chain connection 260 from the output shaft 261 of a speed reducer 262 mounted, with a driving motor 263 therefor, on a platform 265 at the top of the forward portion of the car framework, see Fig. 3. As shown, the chain 260 is enclosed in a protecting housing 266 attached to the trunk 250 and to the casing of the speed reducer unit 262. The material discharged from the trunk 250 falls into the lower end of a second trunk 270 which is correspondingly inclined and which is pivotally connected to the car framework at 271. As shown in Fig. 3, the trunk 250 extends forwardly beyond the front end of the car to overreach the contiguous end of the distributing conveyer means 272 of a dirt car 273. Housed within the trunk 270 is a conveyer 274 consisting of laterally spaced parallel chains 275 which are trained about end sprockets 276 and 277 on shafts 278 and 279 journaled in suitable bearings adjacent the opposite ends of said trunk, said chains being provided with flights 280 like those of the other conveyer chains previously described. The means for driving the conveyer 274 includes an electric motor 281 which is mounted on a platform 282 suspended from the trunk 270 the shaft of said motor being directly connected to a speed reducer 283 also mounted on said platform. The output shaft 285 of the speed reducer 283 is connected, by means of a sprocket chain 287, to a transmission shaft 288 journaled in bearings 289 medially of the top of the trunk 270, and said transmission shaft is in turn connected, by a sprocket chain 290, with the shaft 279 of the sprockets 277. The trunk 270 can be raised or lowered from the position in which it is illustrated by means of a manually operable jack comprehensively designated by the numeral 291 in Figs. 3 and 5. As shown, this jack comprises a cylinder 292 which is supported on a cross member 293 extending between two auxiliary uprights 294 at the front end of the car, and which has the upper end of its piston 295 connected to a cross head 296 whereof the ends slidably engage the inner sides of said uprights, and underreach pad brackets 297 at the underside of the trunk 270 at about the middle.

Figure 2:
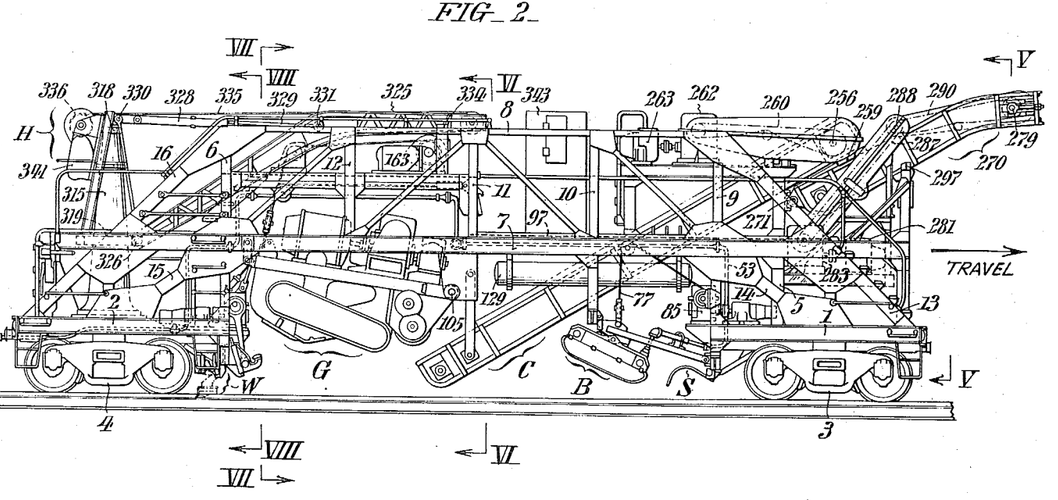
Fig. 2 shows a side elevation of the cleaning car drawn to a larger scale, with the scarifying, blasting, gathering and rail wiping means all raised to inactive or retracted positions.

At the rear end of the sweeper car we have provided a hoisting means which is comprehensively designated by the letter H in Figs. 2 and 4 of the drawings, and includes an upwardly tapered round section pedestal 315 which is mounted on a platform 316 sustained by the rear sills 2 over the center of the rear truck 4 of the car. The pedestal 315 is rigidly secured to the platform 316 at its base by screw bolts (not shown). Supported for rotation about the axis of the pedestal 315 at the top is a head 318, and surrounding the pedestal about midway of its height is a collar 319, said head and said collar being rigidly connected at the back of the crane by a pair of channel struts 321, and at the front by a pair of strut rods 322. The boom 325 of the hoist H is built up as an open structure from standard steel forms and is of obtuse angle configuration as viewed from the side, see Fig. 4, with its laterally spaced side members, see Fig. 4, pivotally connected at their lower ends to the collar 319 at 326. A tension member generally designated 327, consists of two juxtapositioned slide bars 328 and 329 whereof the remote ends are pivotally connected at 330 and 331 respectively to the head collar 318 and to the boom 325. The bars 328 and 329 are maintained in assembled relation through overlap of keeper lugs 332 on the one over the edges of the other. Normally, the tension member 327 is extended as shown in Fig. 2, with a holding pin 333 passed through registering apertures in its component bars 330 and 331 and with the end of the boom resting in a central saddle 334 provided by the body framework of the car above the platform 168, see Fig. 6. Associated with the boom 325 is a cable 335 which extends from a winding drum 336 on the struts 321 to a sheave 337 at the outer end of the boom, and, after the formation therein of a suspension loop 338 for a hook tackle pulley 339, is anchored on said boom at 340. The drum 336 is operable by a reversible electric motor 341 also mounted on the struts 321. The tension member 327 can be shortened as shown in Fig. 4 to support the boom 325 in elevated active position when the hoist is to be used, by passage of the pin 333 through other registerable apertures in the component bars of said member. The hoist H can be employed for various purposes, for example, in mounting the distributing conveyer 272 on the dirt car 273 with the latter on a track alongside the cleaning car preparatory to making up the train in which said dirt car and said cleaning car are interposed as presently explained.

Mounted suostantially centrally of the car body on the control platform 97 is an instrument housing 343 in which are enclosed switches (not shown) for individually controlling the supply of electric current to the various electric motors hereinbefore referred to, through suitable wiring the illustration of which has been omitted from the drawings to avoid complication and confusion. In this connection it is to be understood that speed ratios of the drives for the several conveyers embodied in the car are such as to preclude clogging at any point in the series, that is to say, each conveyer is driven somewhat faster than the one immediately preceding it.

Figure 1:
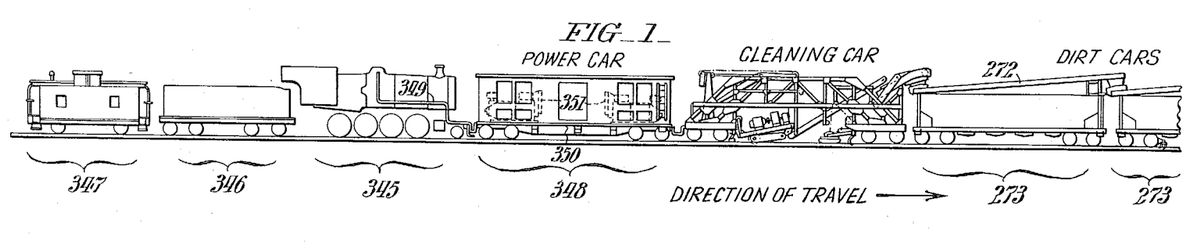
Fig. 1 is a view in side elevation of a railway train in which the track cleaning car of our invention is interposed.

The track cleaning car of my invention is designed for interposition as shown in a train (see Fig. 1) which, in addition to such car, includes a steam locomotive 345 with its tender 346, a caboose 347 and a power car 348 arranged behind the sweeper car, and one or more dirt cars which are placed ahead of said sweeper car. The locomotive 345 not only serves as the means for propelling the train, but supplies the steam needed for the nozzles of the blast means B on the sweeper car, high-pressure steam being conducted from the boiler of the locomotive by means of piping 349 which through piping 350 extending beneath the body of the power car 348 is connected to the piping 53 on said sweeper car, suitable couplings being provided at the junctures of these train units. The power car 348 contains internal combustion motor generator sets 351 that supply current for operating the various electric motors on the sweeper car by way of suitable power lines, not illustrated. The compressed air necessary for operating the cylinders on the track cleaning car may be supplied to the storage tanks from the air brake system (not shown) of the train.

Having thus described our invention, we claim:

1. A railway track cleaning car comprising a body with truck wheels; a dirt gathering unit including a rotary brush and incorporated power drive means for collecting refuse accumulations of sand, cinders, etc. from the track bed between and beyond the rails, said unit being pivotally connected to the car body with capacity to rise and fall upon meeting with abnormal obstructions on said bed; means for lifting the gathering unit about its pivot from operative relation to the track bed when its use is not desired; means for releasably securing said unit in raised position; and regulatable stop means on the body for engaging beneath the free end of the unit to limit the downward movement of the latter for maintenance of the brush in proper operative relation to the track bed, said stop means consisting of a slide with a projection thereon to underreach the free end of the gathering unit, a rotary eccentric with its strap connected to the slide, means for rotatively adjusting the eccentric, and means for preventing rotation of the eccentric in adjusted positions.

2. A railway track cleaning car comprising a body with truck wheels; a dirt gathering unit including a rotary brush and incorporated power drive means for collecting refuse accumulations of sand, cinders, etc., from the track bed between and beyond the rails, said unit being pivotally connected to the car body with capacity to rise and fall upon meeting with abnormal obstructions on said bed; means for lifting the gathering unit about its pivot from operative relation to the track bed when its use is not desired; means for releasably securing said unit in raised position; and regulatable stop means on the body for engaging beneath the free end of the unit to limit downward movement of the latter for maintenance of the brush in proper operative relation to the track bed, said stop means consisting of a slide with a projection thereon to underreach the free or swinging end of the gathering unit, a rotary eccentric with its strap connected to the slide, power means for rotating the eccentric, and brake means for preventing rotation of the eccentric in adjusted positions.

3. A railway track cleaning car comprising a body with truck wheels; a dirt gathering unit including a rotary brush and incorporated power drive means for collecting refuse accumulations of sand, cinders, etc. from the track bed between and beyond the rails, said unit being pivotally connected to the car body with capacity to rise and fall upon meeting with abnormal obstructions on said bed; means for lifting the gathering unit about its pivot from operative relation to the track bed when its use is not desired; and means for releasably securing said unit in raised position, consisting of a keeper in the form of a vertical lever which is fulcrumed at its lower end to the car body so that its upper end can be moved beneath a notched projection at the free end of the unit when the latter is raised, and power means on the car body for actuating the lever.

4. A track cleaning railway car comprising a body with truck wheels; a dirt gathering unit including a rotary brush, a supporting frame therefor pivotally connected to the car body with capacity for up and down movement, means for releasably supporting the frame in its elevated position including a keeper in the form of a vertical lever fulcrumed at its lower end on the car body so as to be swingable beneath a notched projection at the free end of the frame; and power means on the car body for actuating said lever.

5. A track cleaning railway car comprising a body with truck wheels; a dirt gathering unit including a rotary brush, a supporting frame therefor connected to the car body with capacity for up and down movement, and power means on the frame for driving the brush; a dirt collecting housing attached to the frame and enclosing the brush except at the region of its contact with the track bed and having an upwardly inclined bottom wall with a discharge aperture centrally thereof at an elevated portion, means within the housing adjacent the brush and driven by another motor on the frame for upwardly and laterally diverting the accumulating dirt toward said aperture; and a separately driven elevating conveyer for receiving the discharged dirt and delivering it at a higher level from the car.

6. A track cleaning railway car comprising a body with truck wheels; and a dirt gathering unit supported by the car body, said unit including a rotary brush with end groups of flat bristles skewed respectively in opposite directions so as to displace the dirt on the track bed inwardly away from the track rails, a dirt collecting housing enclosing the brush except at the region of its contact with the track bed, a pivotally supported element within the housing for flipping the brush bristles to release clinging dirt, and means externally of the housing for adjusting said element and a cooperative baffle means also within the housing for deflecting the dirt so released away from the brush.

7. A track cleaning railway car comprising a body with truck wheels; a dirt gathering unit including a frame pivotally connected at one end to the car body with capacity for up and down movement, a rotary brush floatingly supported for up and down movement by arms fulcrumed on the frame, and pressure fluid means mounted on the frame and operatively connected to the brush arms to preclude bouncing of the brush as it passes over surface irregularities of the track bed.

8. A track cleaning railway car comprising a body with truck wheels; a dirt gathering unit including a frame pivotally connected at one end to the car body with capacity for up and down movement, a rotary brush floatingly supported for up and down movement by arms fulcrumed on the frame, a pressure fluid cylinder mounted on the frame and leverage connections between the brush-supporting arms and the piston of said cylinder to preclude bouncing of the brush as it passes over surface irregularities of the track bed.

9. A railway track cleaning car, comprising a body with wheeled supporting trucks; a dirt gathering unit including a frame pivotally connected at one end to the car body with its free end bearing upon a vertically adjustable stop on the car body, a transverse axis rotary brush, an arm fulcrumed on the frame in the distal end of which the brush is rotatively supported with capacity for limited up and down movement, an electric motor and a direct-connected speed reducer mounted on the frame, and chain gearing by which the brush is driven from the speed reducer; and means for lifting the unit about its pivotal connection with the car body to raise the brush clear of the track bed when its use is not desired.

10. A railway track cleaning car, according to claim 9, in which the dirt cleaning unit further includes a casing supported by the frame and enclosing the brush, said casing having an upwardly inclined bottom wall, an endless belt conveyer for elevating dirt delivered by the brush into a pocket within the upper portion of the casing, a second speed reducer mounted on the frame and also direct connected to the motor, and chain gearing by which the dirt elevating conveyer is driven from said second speed reducer.

11. A railway track cleaning car according to claim 9, in which the dirt cleaning unit further includes a casing supported by the frame and enclosing the brush, said casing having an upwardly inclined bottom wall, an endless belt conveyer for elevating dirt gathered by the brush into a pocket in the upper portion of the casing, a transverse axis screw conveyer with right and left hand thread portions for advancing the elevated dirt to an outlet aperture centrally of the bottom of the pocket, a second speed reducer mounted on the frame and also direct connected to the motor, and chain gearing by which the dirt elevating conveyer and the screw conveyer are driven from said second speed reducer.

12. A track cleaning car comprising a body with wheeled supporting trucks; a dirt gathering unit including a frame pivotally connected at one end to the car body and having its free end bearing upon a vertically adjustable stop on the car body, an arm fulcrumed on the frame with capacity for limited up and down movement, a transverse axis brush rotatively supported in the distal end of the arm, an electric motor and a direct connected speed reducer mounted on the frame, a sprocket wheel on the output shaft of the speed reducer connected by a chain to a sprocket wheel on the fulcrum axis of the arm, and a second sprocket on said fulcrum axis connected by another chain to a sprocket wheel on the axis of the brush; and means for moving the unit about its pivotal connection with the car body to raise the brush clear of the track bed when its use is not desired.

13. A railway track cleaning car comprising front and rear trucks with wheels to run on the track rails; a body with end platforms immediately over the respective trucks, and a medially disposed operator's control platform elevated above the level of the end platforms, with provision therebeneath, of a correspondingly high clear space between trucks; a rotary brush dirt gathering unit pivotally supported from the body adjacent the rear truck with capacity for up and down movement in the clear space aforesaid during the sweeping; means for lifting the gathering unit clear of the track, when its use is not desired, including a motor on the control platform; and retractable means on one of the end platforms for holding the gathering unit in raised position.

14. A railway track cleaning car comprising front and rear trucks with wheels to run on the track rails; a body with end platforms immediately over the respective trucks, a medially disposed operator's control platform at an elevation above that of the end platforms, with provision therebeneath, of a correspondingly high clear space between trucks; a rotary dirt gathering unit pivotally supported from the body adjacent the rear truck with capacity for up and down movement in the clear space aforesaid during the sweeping; means for lifting the gathering unit clear of the track, when its use is not desired, including a motor on the control platform; retractable means on the rear end platform for holding the gathering unit in raised position; an elevating sprocket chain conveyer supported by, and extending upwardly and forwardly at an inclination through the body from a point below a discharge outlet at the front of a housing enclosing the brush of the gathering unit and operative to deliver dirt received from said housing to a point above the front truck for discharge from the car; and means for actuating the lift conveyer including a motor also mounted on the platform, and drive connections between said motor and the upper sprocket shaft of the conveyer.

15. A track cleaning car according to claim 14, in which the body has the form of a truss of structural steel with short side longitudinals immediately over the trucks supporting the end platforms, full length side longitudinals at a level well above the short longitudinals supporting the control platform, and uprights and cross members connecting said longitudinals.

16. A railway track cleaning car comprising front and rear trucks with wheels to run on the track rails; a body with end platforms immediately over the respective trucks; a medially disposed operator's control platform at a level above that of the end platforms, with provision therebeneath of a correspondingly high clear space between trucks, and a supplemental platform over the front end truck at a level intermediate the platform on the latter truck and the control platform; a rotary brush dirt gathering unit pivotally supported from the body adjacent the rear truck with capacity for up and down movement in the clear space aforesaid during the sweeping; means for lifting the gathering unit clear of the track when its use is not desired including a motor on the control platform; and retractable means on the rear end platform for holding the gathering unit in raised position; an elevating conveyer unit composed of two sections respectively with endless sprocket chains, one section extending upwardly and forwardly through the car body from a point below a discharge outlet at the front of a housing enclosing the brush of the gathering unit to a point above the front truck, and the other section being in parallel relation to the first section with its receiving end below the delivery end of the first section and extending forwardly and upwardly to discharge beyond the front end of the car; means for actuating the chain of the first conveyer section including a motor on the control platform, and drive connections between said motor and the upper sprocket shaft of said first section; and means for actuating the second conveyer section including a motor mounted on the supplemental platform, and drive connections between the latter motor and the upper sprocket shaft of said second conveyer section.

ROBERT N. MILLER.
WILLIAM H. GRINDALL.

REFERENCES CITED

The following references are of record in the file of this patent:

UNITED STATES PATENTS

| Number | Name | Date |
|---|---|---|
| 294,084 | Schulze | Feb. 26, 1884 |
| 343,353 | Wright | June 6, 1886 |
| 418,063 | Reynolds | Dec. 24, 1889 |
| 612,789 | Reynolds | Oct. 18, 1898 |
| 617,420 | Huff | Jan. 10, 1899 |
| 651,880 | McCrory et al. | June 19, 1900 |
| 720,474 | Pike | Feb. 10, 1903 |
| 876,727 | Pevey | Jan. 14, 1908 |
| 935,821 | Santin | Oct. 15, 1909 |

(Other references on following page)

UNITED STATES PATENTS

| Number | Name | Date |
|---|---|---|
| 936,256 | Quertier | Oct. 5, 1909 |
| 971,158 | Soos | Sept. 27, 1910 |
| 972,058 | Chisholm | Oct. 4, 1910 |
| 1,000,798 | Gregory | Aug. 15, 1911 |
| 1,087,588 | Killman | Feb. 17, 1914 |
| 1,187,209 | Warner | June 13, 1916 |
| 1,212,183 | Brumbaugh | Jan. 16, 1917 |
| 1,241,114 | Hedley et al. | Sept. 25, 1917 |
| 1,238,855 | Webster | Sept. 4, 1917 |
| 1,416,231 | Olson | May 16, 1922 |
| 1,468,528 | Vena | Sept. 18, 1923 |
| 1,469,464 | Ursino | Oct. 2, 1923 |
| 1,495,095 | Morris | May 20, 1924 |
| 1,527,541 | Dougherty | Feb. 24, 1925 |
| 1,546,441 | Frayer | July 21, 1925 |
| 1,615,348 | Schroeder | Jan. 25, 1927 |
| 1,630,580 | Protzeller | May 31, 1927 |
| 1,826,069 | Guilbert et al. | Oct. 6, 1931 |
| 1,906,766 | Ray | May 2, 1933 |
| 2,027,091 | Cartlidge | Jan. 7, 1936 |
| 2,055,011 | Hough | Sept. 22, 1936 |
| 2,248,699 | Finnell | July 8, 1941 |
| 2,398,241 | Miller et al. | Apr. 9, 1946 |